United States Patent
Sarda et al.

(10) Patent No.: US 10,296,422 B1
(45) Date of Patent: May 21, 2019

(54) LOW COST, HETEROGENEOUS METHOD OF TRANSFORMING REPLICATED DATA FOR CONSUMPTION IN THE CLOUD

(71) Applicant: Veritas Technologies LLC, Mountain View, CA (US)

(72) Inventors: Pooja Sarda, Cupertino, CA (US); Anish A. Vaidya, San Jose, CA (US); Manjunath Mageswaran, Sunnyvale, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 269 days.

(21) Appl. No.: 14/611,233

(22) Filed: Jan. 31, 2015

(51) Int. Cl.
*G06F 11/00* (2006.01)
*G06F 11/14* (2006.01)
*H04L 29/08* (2006.01)

(52) U.S. Cl.
CPC ...... *G06F 11/1464* (2013.01); *G06F 11/1451* (2013.01); *H04L 67/1095* (2013.01)

(58) Field of Classification Search
CPC ............. G06F 11/1466; G06F 11/2028; G06F 11/1451; G06F 11/1446; G06F 11/1464; G06F 11/1469
USPC ........................................................ 714/4.11
See application file for complete search history.

(56) References Cited

U.S. PATENT DOCUMENTS

| | | | | |
|---|---|---|---|---|
| 6,289,390 B1 * | 9/2001 | Kavner | ................... | G06F 9/547 709/200 |
| 7,010,553 B2 * | 3/2006 | Chen | ................... | G06F 11/1435 |
| 7,593,344 B2 * | 9/2009 | Jordan | ................... | G07C 5/008 370/241 |
| 7,802,137 B2 * | 9/2010 | Kawamura | ......... | G06F 11/2064 714/15 |
| 8,566,542 B1 * | 10/2013 | Wang | ................... | G06F 11/1456 711/114 |
| 8,612,396 B1 * | 12/2013 | McAlister | ........... | G06F 11/1471 707/674 |
| 8,832,039 B1 * | 9/2014 | Sorenson, III | ............ | G06F 7/00 707/679 |
| 8,898,112 B1 * | 11/2014 | Natanzon | ............ | G06F 11/2074 707/634 |
| 9,092,375 B1 * | 7/2015 | Dalal | ................... | G06F 11/1451 |
| 9,110,914 B1 * | 8/2015 | Frank | ................ | G06F 17/30156 |
| 9,268,651 B1 * | 2/2016 | Salyers | ............... | G06F 11/1464 |

(Continued)

*Primary Examiner* — Elmira Mehrmanesh
(74) *Attorney, Agent, or Firm* — Campbell Stephenson LLP

(57) ABSTRACT

Various systems, methods and apparatuses for replicating data from homogeneous and/or heterogeneous primary computing systems to a single recovery computing system are presented. In one embodiment, the methods, systems and apparatuses described herein allow a computing system to receive information from a remote computing system, where the information contains at least data and a logical storage location corresponding to the location of the data in a logical storage unit of the remote computing system. Upon receiving the data and associated logical storage location, the methods, systems and apparatuses described herein can store the information at a specific location in a storage device such as, for example, a block storage device. The specific location can be determined, for example, based on the logical storage location provided by the remote computing system and an offset associated with the starting location of the relevant logical storage unit on the storage device.

20 Claims, 11 Drawing Sheets

(56) References Cited

U.S. PATENT DOCUMENTS

| | | | | |
|---|---|---|---|---|
| 9,348,849 B1* | 5/2016 | Mandic | ............ | G06F 17/30289 |
| 9,495,435 B2* | 11/2016 | Zhang | ............... | G06F 17/30581 |
| 9,501,546 B2* | 11/2016 | Bhargava | .......... | G06F 17/30581 |
| 9,904,603 B2* | 2/2018 | Mutalik | ............... | G06F 11/1451 |
| 2003/0217119 A1* | 11/2003 | Raman | ................ | H04L 67/1095 709/219 |
| 2004/0172509 A1* | 9/2004 | Takeda | ................ | G06F 11/2066 711/162 |
| 2007/0022144 A1* | 1/2007 | Chen | .................... | G06F 11/2064 |
| 2010/0049798 A1* | 2/2010 | McCabe | ............... | G06F 3/0626 709/203 |
| 2010/0333116 A1* | 12/2010 | Prahlad | ................ | G06F 17/302 719/328 |
| 2014/0337483 A1* | 11/2014 | Sorenson, III | .... | G06F 17/30203 709/219 |
| 2015/0245249 A1* | 8/2015 | Grootwassink | ..... | H04L 12/4633 370/328 |
| 2016/0041880 A1* | 2/2016 | Mitkar | ................ | G06F 11/1412 707/680 |

\* cited by examiner

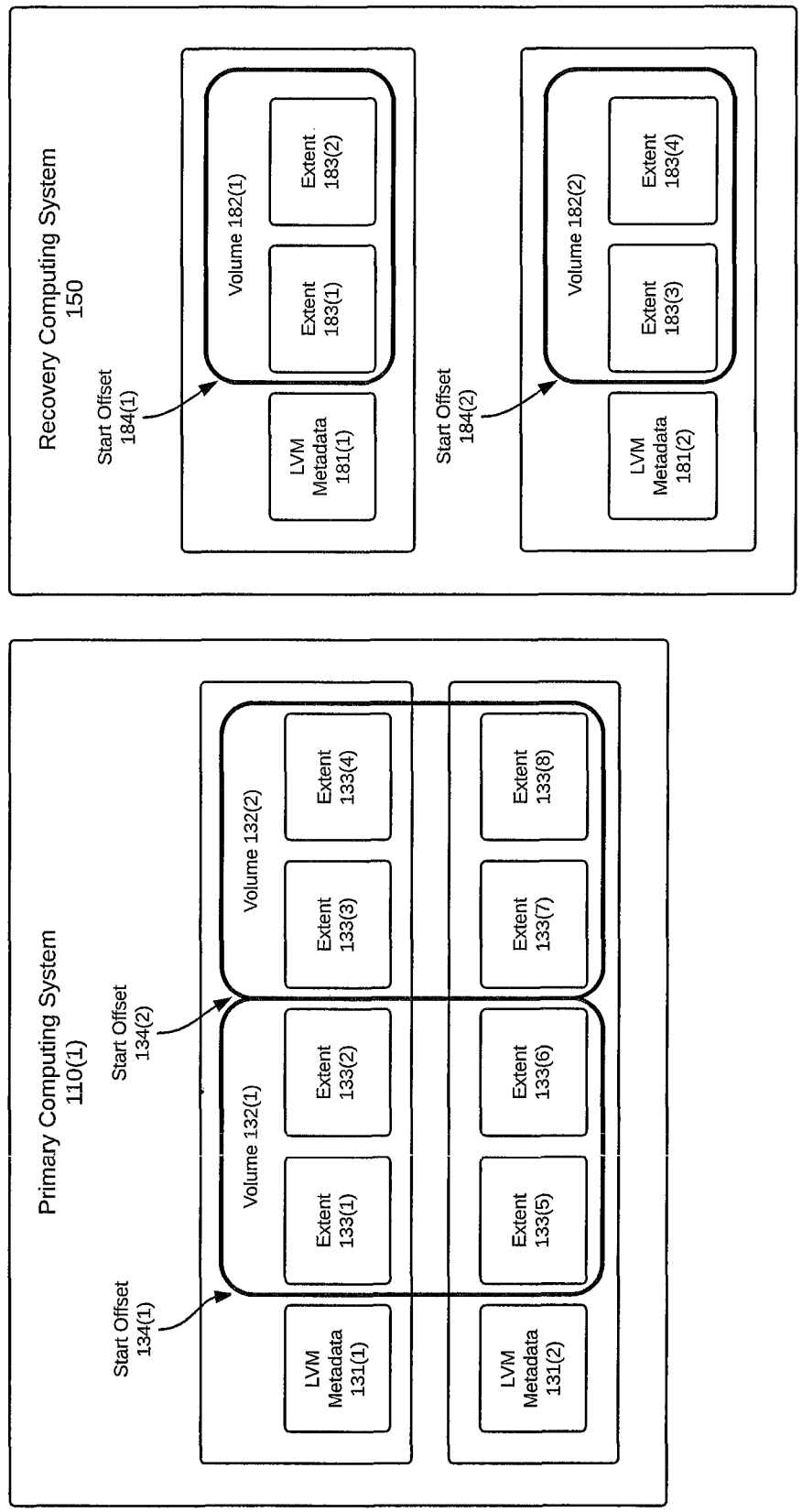

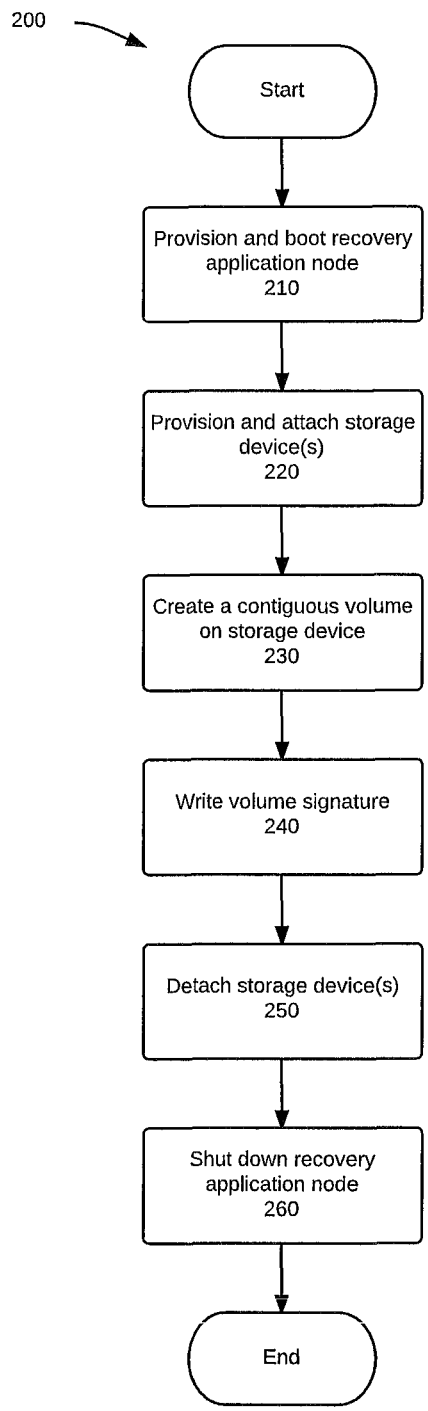

LOW COST, HETEROGENEOUS METHOD OF TRANSFORMING REPLICATED DATA FOR CONSUMPTION IN THE CLOUD

FIELD OF THE INVENTION

This invention relates to data replication, and more particularly, to replicating data from homogenous and/or heterogeneous primary sites to a single recovery site in an efficient manner.

DESCRIPTION OF THE RELATED ART

Many entities have begun to use "the cloud" for many services, including data replication and disaster recovery services. In a remote computing environment such as, for example, the cloud, an entity or other user faces costs related to the resources used to store, process, and use data, including computer and network resources, among other such costs. Moreover, additional costs and complications may arise when a single recovery computing environment is required to support heterogeneous primary computing environments. For instance, such a recovery computing environment may require the licensing and support of multiple operating systems, volume managers, file systems, applications, and so forth. Such a structure results in increased costs for both the provider as well as the user, such as, for example, costs related to procuring and maintaining the necessary licenses, as well as training and manpower costs associated with servicing and maintaining potentially myriad resources and configurations.

SUMMARY OF THE INVENTION

Various systems, methods and apparatuses for replicating data from homogeneous and/or heterogeneous primary computing systems to a single recovery computing system are presented. Also presented are various systems, methods and apparatuses for using data that was replicated in accordance with the methods and systems described herein, where such data can be used by a recovery computing system (e.g., as part of a "failover"). The primary computing systems can be, for example, a production site or other primary site or system. The recovery computing system can be, for example, a "disaster recovery" or "failover" site or system. Moreover, the recovery computing system can be a site or system that is part of (or otherwise is communicatively coupled to) a computing network, such as, for example, a "cloud." As used herein, a "cloud" computing environment can include, for example, a private cloud, a public cloud and hybrid cloud environments. The methods, systems and apparatuses described herein are equally applicable to any type of cloud computing environment, including, but not limited to, the types of environments that are specifically enumerated herein.

Among other functionality, the methods, systems and apparatuses described herein allow a computing system to receive information from a remote computing system, where the information contains at least data and a logical block number corresponding to the location of the data in a volume on the remote computing system. Upon receiving the data and associated logical block number, the methods, systems and apparatuses described herein can be used to store the information at a specific location in a storage device such as, for example, a block storage device. The specific location can be determined, for example, based on the logical block number provided by the remote computing system, as well as an offset associated with the starting location of the relevant volume on the storage device. In other embodiments, such data can be used by one or more recovery application nodes on such a computing system, such as, for example, in the case of a failover or disaster recovery scenario.

Thus, the functionality disclosed herein includes the functionality to set up a replication environment, use such an environment to perform replication, and use such replicated data in conjunction with a recovery computing system. The systems, methods and apparatuses described herein allow such functionality to be provided by a single recovery computing system that is coupled to homogenous and/or heterogeneous primary computing systems. As such, the functionality disclosed herein provides for low-cost and efficient solutions, particularly for the replication of data and use of replicated data by recovery computing systems in the cloud.

The foregoing is a summary and thus contains, by necessity, simplifications, generalizations and omissions of details, consequently those skilled in the art will appreciate that this summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

FIG. 1C is a block diagram showing additional details related to the storage of data in the primary computing system and recovery computing system depicted in FIG. 1A, according to one embodiment.

FIG. 2 is a flowchart that illustrates actions that can be performed to configure replication of data, according to one embodiment.

Figure 1A:
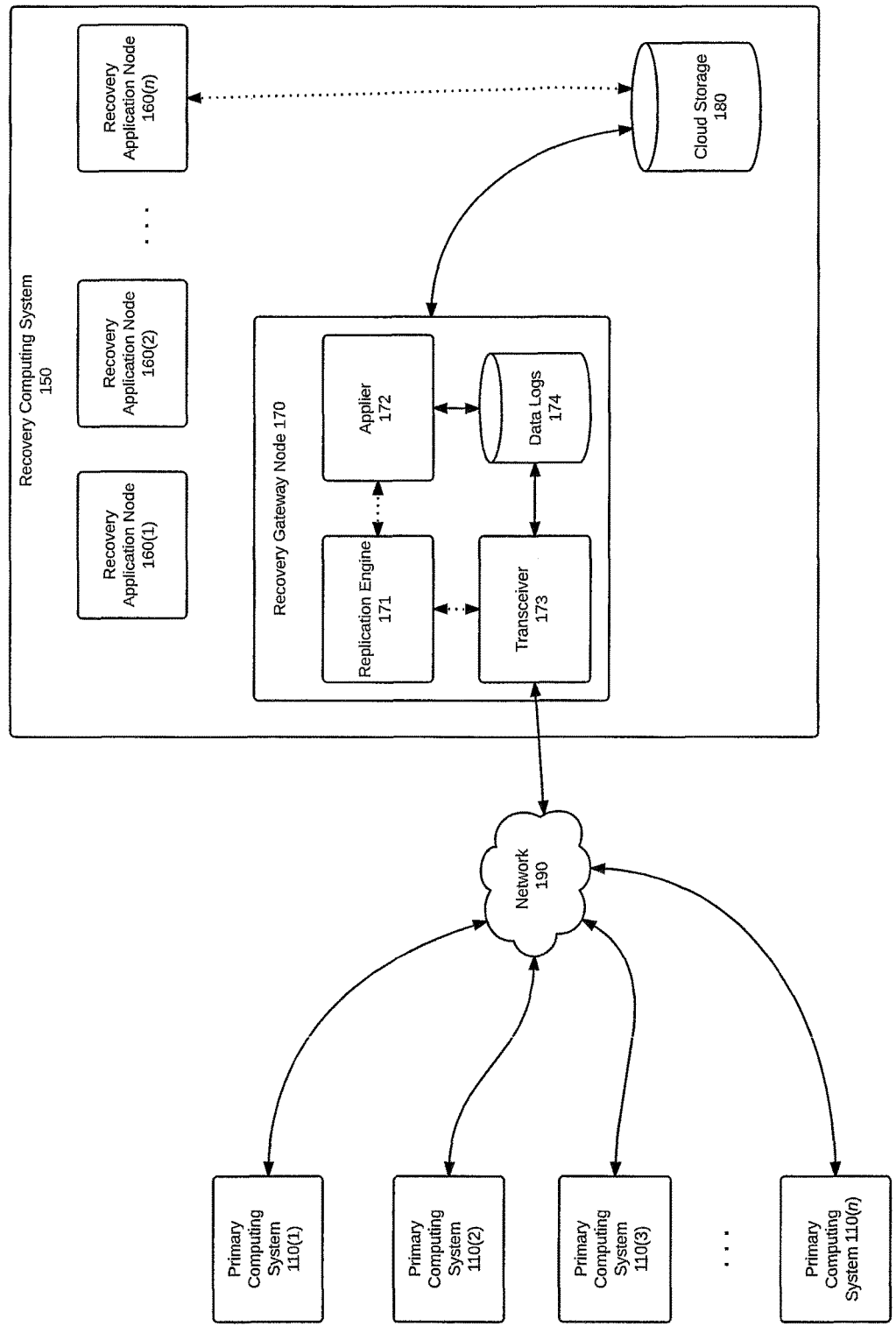
FIG. 1A is a block diagram of a plurality of primary computing systems and a recovery computing system connected via a network, according to one embodiment.

While methods and systems such as those disclosed herein are susceptible to various modifications and alternative forms, specific embodiments of such methods and systems are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Disclosed herein are methods and systems for replicating data, and using such replicated data. More particularly, the methods and systems disclosed herein provide for performing data replication and usage in a recovery computing environment, such as, e.g., a "cloud" computing environment. In one embodiment, a single recovery computing system can be designed and configured to support multiple, potentially-heterogeneous primary computing systems. Thus, a single recovery computing system can support multiple primary computing systems, even if those primary computing systems employ different operating systems, logical volume managers, file systems, applications, or other configuration attributes. Of course, however, the primary computing systems need not be wholly different from each other, and in fact may even be identical (or largely identical) to each other. Regardless of the specific configurations of the primary computing system(s), however, a recovery computing system designed in accordance with this disclosure can operate in a manner that is largely independent of those primary computing system(s).

FIG. 1A is a block diagram of primary computing systems 110(1)-110(n) (collectively "computing systems 110") connected via a network 190 to a single recovery computing system 150, according to one embodiment. As will be appreciated from this depiction, any number of primary computing systems 110 can be connected to a single recovery computing system 150. Moreover, as mentioned above, each of the primary computing systems 110 can have a configuration that is distinct (either in whole or in part, or not at all) from other primary computing systems 110. As one example, one of the primary computing systems 110 may use a WINDOWS operating system, another of the primary computing systems 110 may use a LINUX operating system, and other primary computing systems 110 may use different operating systems. Other aspects of the configurations of primary computing systems 110 may also vary among each of the primary computing systems 110, including logical volume managers, file systems, applications, and physical configurations (e.g., storage/memory, processor type and speed, and so forth). Moreover, the components of the primary computing systems 110 (such as the component depicted in FIG. 1B, for example) and the components of the recovery computing system 150 (such as the components depicted in FIGS. 1A and 1B, for example) may also implement distinct operating systems, logical volume managers, file systems, application, physical configurations, and so forth. However, the primary computing systems 110 (or components thereof) do not have to be different from each other. Indeed, one or more of primary computing systems 110 (or components thereof) may have one or more aspects of their respective configurations in common, and may even have configurations that are identical (either in whole or in part) to one or more other primary computing systems 110 (or components of the same or other primary operating systems 110). Thus, the ability for a single recovery computing system to support heterogeneous primary computing systems (and components thereof) does not mandate that the primary computing systems (and components thereof) are actually heterogeneous with respect to each other, but rather merely makes the support of such heterogeneous systems possible.

Regardless of the specific configurations of primary computing systems 110, methods and systems such as those disclosed herein allow multiple such systems to share a common recovery computing system 150. As will be explained in more detail below, recovery computing system 150 contains various components, including, but not limited to, one or more recovery application nodes 160(1)-160(n) (collectively, "recovery application nodes 160"). Each recovery application node 160 in the recovery computing system can be configured to host one or more applications and/or virtual machines, among other features and functionality of recovery application nodes 160.

Recovery computing system 150 is communicatively coupled to a gateway node, such as recovery gateway node 170. In accordance with one embodiment, a gateway node such as recovery gateway node 170 may contain a replication engine 171, an applier 172, a transceiver 173, and one or more units of storage configured to store data logs 174. In one embodiment, replication engine 171 can be any hardware or software (or combination thereof) configured to perform one or more of the methods (either in whole or in part) that are discussed elsewhere in this disclosure, including but not limited to methods 200, 300, 500 and 600. In one embodiment, applier 172 can be any hardware or software (or combination thereof) configured to operate on information (e.g., data and the logical block number associated with such data) received from a primary computing system 110. In one embodiment, applier 172 can be configured to read from data logs 174 and/or cloud storage 180, and can also be configured to perform one or more steps of any of the methods described herein, including but not limited to methods 200, 300, 500, and 600. In one embodiment, the applier can be configured to apply changes (e.g., write data) from replication engine 171 and/or data log 174 to one or more data storage location(s) in cloud storage 180. Transceiver 173 can be any device capable of both transmitting and receiving information to/from a network, such as, e.g., network 190. In one embodiment, transceiver 173 is a device that is capable of applying electronic signals (e.g., digital or analog signals) to a network wire (such as, e.g., in network 190) and receiving such signals from a network wire. In one embodiment, transceiver 173 is a device that is capable of applying and receiving wireless signals to/from a network (such as, e.g., in network 190). Data logs 174 can be any non-transient, computer-readable storage medium that is capable of storing information about the data being replicated, including but not limited to logging transactions that are performed during such replication. As some examples, data logs 174 may be a storage area network (SAN), network-attached storage (NAS), hard disk, flash memory, or other data storage system. In one embodiment, a single recovery gateway node can be communicatively coupled to multiple primary computing systems 110, and can also be communicatively coupled to multiple recovery application nodes 160.

Recovery computing system 150 also includes a block storage device, such as cloud storage device 180. Cloud storage device 180 may be any sort of non-transient, computer-readable storage medium that is appropriate for storing data. As some examples, cloud storage device 180 may be a storage area network (SAN), network-attached storage (NAS), hard disk, flash memory, or other data storage system. Although cloud storage device 180 is referenced in the singular throughout this disclosure, cloud storage device 180 may include multiple distinct physical units of storage, such as, e.g., multiple databases, multiple hard disk drives, and so forth. Moreover, while the storage units and systems that are used to implement the storage devices described herein as block storage devices, such storage devices are referred to as "block storage devices" and/or "cloud storage" merely for ease and consistency of description. As will be appreciated in view of the present disclosure, however, numerous other storage systems and devices, alone or in combination, can be used to equally good effect in methods and systems such as those described herein. As will be discussed below, a block storage device (e.g., cloud storage device 180) can be configured to use one physical disk per logical volume, and can also be to configured to use different physical disks for multiple logical volumes. Thus, with respect to the recovery computing system, each physical disk is associated with only a single volume, although a single volume may span more than one physical disk. This eliminates the need for mappings typically required on the recovery computing system. Moreover, each logical volume is configured to correspond to a single group of contiguous physical extents (e.g., units of physical storage). Thus, each block storage device can be said to contain one or more contiguous volume(s). Moreover, although the methods and systems disclosed herein are discussed in terms of "blocks," any unit of storage can be used in conjunction with such methods and systems. As will be explained in more detail elsewhere in this disclosure, cloud storage device 180 can be communicatively coupled to recovery gateway node 170, and can also be coupled to one or more of recovery application nodes 160, as needed and appropriate in conjunction with this disclosure.

Although not expressly depicted, recovery gateway node 170 uses an operating system, such as LINUX or WINDOWS, among other appropriate computer operating systems. As mentioned elsewhere herein, the operating system used by recovery gateway node 170 can be different from (or the same as) the operating system(s) used by one or more of the primary computing systems 110 (or components thereof, such as primary application node 120(1) and/or primary gateway node 140). Similarly, the hardware and software configuration(s) of recovery computing system 150 can be the same as or different from, either in whole or in part, the hardware and software configuration(s) of primary computing systems 110. Ideally, however, recovery computing system 150 should have sufficient hardware and software resources to serve as a recovery site for each of the primary sites associated with one or more of primary computing systems 110.

Figure 1B:
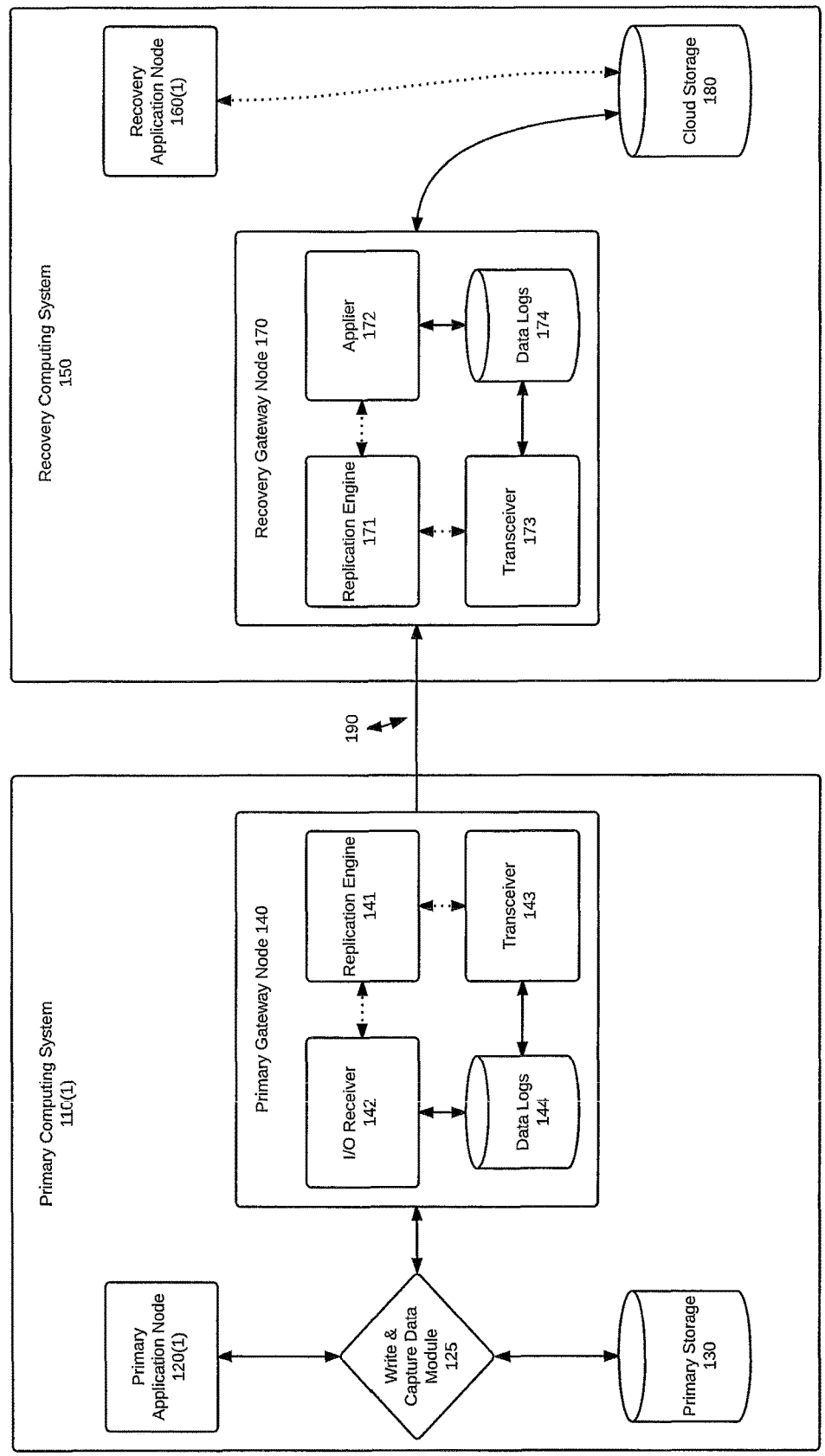
FIG. 1B is a block diagram containing an enhanced view of a single primary computing system and a recovery computing system connected via a network, according to one embodiment.

As indicated above, more than one primary computing system 110 may be connected to a single recovery computing system 150. FIG. 1B provides a more detailed depiction of one such primary computing system, that being primary computing system 110(1). As shown in FIG. 1B, primary computing system 110(1) is connected via a network 190 to recovery computing system 150, according to one embodiment. Although one example configuration of a primary computing system is shown in FIG. 1B, each primary computing system 110 can have a configuration that is distinct from other of the primary computing systems 110. Nevertheless, such differentiation between primary computing systems 110 is merely an option, and not a requirement, of this disclosure.

FIG. 1B depicts one possible configuration of primary computing system 110(1) that is similar (although not necessarily identical) to the configuration of recovery computing system 150. For instance, primary computing system 110(1) includes a primary application node configured to host one or more applications and/or virtual machines, such as primary application node 120(1). Although only one primary application node 120(1) is expressly depicted in FIG. 1B, in practice a single primary computing system 110(1) may host multiple primary application nodes 120. In one embodiment, multiple primary application nodes 120 can perform the functionality disclosed herein simultaneously, or substantially simultaneously, with respect to other such primary application nodes 120. In embodiments where a single primary computing system 110 hosts multiple primary application nodes 120, one or more (or all) of those primary application nodes 120 can use the same data capture module 125, primary storage device 130 and/or primary gateway node 140.

As will be explained in more detail elsewhere in this disclosure, primary computing systems (such as, e.g., primary computing system 110(1)) can write and capture data in accordance with methods and systems such as those disclosed herein, as will be explained in more detail in method 400, described in more detail below. In one embodiment, one or more of the steps of method 400 can be performed by a hardware and/or software module configured to perform those steps, such as, e.g., data capture module 125. In addition to performing (or being used to perform) the steps of method 400, data capture module 125 can also write (or facilitating the writing of) data to primary storage 130. In one embodiment, data capture module 125 can be integrated into one or more of primary application nodes 120, primary storage 130, primary gateway node 140, and/or other hardware and/or software. Although discussed in the singular throughout this disclosure, data capture module 125 can include two or more distinct physical and/or logical components that are configured to work together. Data capture module 125 can also be configured, either in whole or in part, to be a stand-alone hardware and/or software module that is communicatively coupled to one or more other components of primary computing system(s) 110. Where data capture module 125 includes multiple components, those components may be integrated into multiple components of a primary computing system 110, such as, e.g., one or more primary application nodes 120, primary storage 130, primary gateway node 140, and/or stand-alone hardware or software modules. Moreover, data capture module can be communicatively coupled to one or more of primary application nodes 120, primary storage 130, and/or primary gateway node 140, as appropriate. In one embodiment, one or more of primary application nodes 120 can be configured to include data capture module 125 (in the form of either a hardware and/or software module).

Primary computing system 110(1) includes a storage device, such as primary storage device 130. Primary storage device 130 may be any sort of non-transient, computer-readable storage medium that is appropriate for storing data. As some examples, primary storage device 130 may be a database, hard disk, flash memory, or other data storage system. In addition to the physical disk storage, primary storage device 130 also contains one or more logical volumes. Moreover, although referred to in the singular throughout this disclosure, primary storage device 130 may include multiple distinct physical (e.g., multiple databases, multiple hard disk drives, and so forth) and logical (e.g., volumes) units of storage.

Primary computing system 110(1) is communicatively coupled to a gateway node, such as primary gateway node 140. In accordance with one embodiment, a gateway node such as primary gateway node 140 may contain a replication engine 141, an I/O receiver 142, a transceiver 143, and one or more units of storage configured to store data logs 144. In one embodiment, replication engine 141 can be any hardware or software (or combination thereof) configured to perform one or more of the methods (either in whole or in part) that are discussed elsewhere in this disclosure, including but not limited to method 400. I/O receiver 142 can be any hardware or software (or combination thereof) configured to perform one or more of the methods (either in whole or in part) that are discussed elsewhere in this disclosure, including but not limited to method 400. In one embodiment, I/O receiver 142 is configured to receive information captured from primary application node 120(1), and to communicate that information to other components of primary gateway node 140. Transceiver 173 can be any device capable of both transmitting and receiving information to/from a network, such as, e.g., network 190. In one embodiment, transceiver 143 is a device that is capable of applying electronic signals (e.g., digital or analog signals) to a network wire (such as, e.g., in network 190) and receiving such signals from a network wire. In one embodiment, transceiver 143 is a device that is capable of applying and receiving wireless signals to/from a network (such as, e.g., in network 190). Data logs 144 can be any non-transient, computer-readable storage medium that is capable of storing information about the data being replicated, including but not limited to logging transactions that are performed during such replication. As some examples, data logs 144 may be a storage area network (SAN), network-attached storage (NAS), hard disk, flash memory, or other data storage system.

Moreover, as discussed elsewhere, each primary computing system 110, and each component thereof (such as, e.g., the components depicted in FIG. 1B) can implement distinct operating systems, logical volume managers, file systems, application, physical configurations, and so forth, although such distinction is only an option but not a requirement of the methods, systems and apparatuses disclosed herein.

The specific configuration of recovery computing system 150 depicted in FIG. 1B is generally the same as the recovery computing system 150 described above. As compared to the depiction in FIG. 1A, however, FIG. 1B focuses on a single recovery application node 160 rather than depicting all of the recovery application nodes 160(1)-160(n) that are shown in FIG. 1A. In practice, however, a single recovery computing system and a single primary computing system can each contain one or more application nodes.

FIG. 1C depicts additional details related to the storage of data in the primary computing system and recovery computing system depicted in FIG. 1A, according to one embodiment. More specifically, FIG. 1C depicts mirrored storage volumes on a primary computing system (e.g., primary computing system 110(1)) and corresponding block storage volumes on a recovery computing system (e.g., recovery computing system 150). The mirrored storage volumes on primary computing system 110(1) are identical copies of each other. Each mirrored copy (i.e., each "row" in the Figure) are identical (or substantially identical) copies of each other. Each mirrored copy contains logical volume manager (LVM) metadata 131 that can describe the content and location of the underlying data. Each mirrored copy contains two logical volumes, 132(1) and 132(2). In this depiction, each of those logical volumes contains two physical extents 133 that are mirrors of each other. Thus, extent 133(1) is a minor of extent 133(5), extent 133(2) is a minor of extent 133(6), extent 133(3) is a minor of extent 133(7), and extent 133(4) is a minor of extent 133(8). Although only two volumes are shown in this depiction, with each volume only containing two physical extents, in application one or more volumes may be present, and each of those volumes may have one or more physical extents of varying sizes. Also depicted are the starting offsets 134(1) and 134(2) for each of the depicted volumes.

Recovery computing system 150 also contains two volumes, but, in accordance with methods and systems such as those disclosed herein, those volumes 182(1) and 182(2) are not mirrored copies of each other. (In practice, one or more of volumes 182(1) and 182(2) may be mirrored, although such mirroring is neither required by this invention nor depicted as the focus of FIG. 1C.) Rather, volume 182(1) stores data corresponding to volume 132(1) on the primary computing system, and volume 182(2) stores data corresponding to volume 132(2) on the primary computing system. Although not required in practice, each of the volumes 182(1) and 182(2) depicted here each contain the same number of physical extents 183 as the corresponding volume on primary computing system 110(1), which, in this case, is two physical extents 183 for each volume. In other embodiments, one or more volumes 182 on a recovery computing system (such as, e.g., recovery computing system 150) may have a different number of physical extents 183 than other volumes 182 on that (or on a different) recovery computing system. Moreover, the number of physical extents per volume 182 on a recovery computing system (such as, e.g., recovery computing system 150) may be different from the number of physical extents on a corresponding volume 132 on a primary computing system (such as, e.g., primary computing system 110(1)). Similarly to the primary computing system, each volume on the recovery computing system contains LVM metadata 181, which contains information about the associated volume. Moreover, as noted elsewhere, the logical volume manager(s) on the recovery computing system 150 may be different than the logical volume managers implemented on one or more of primary computing systems 120. Also, each volume on the recovery computing system has a start offset 184, which corresponds to the logical block location (or location of another unit of storage) where the associated volume begins (e.g., the logical block location immediately after the location where the LVM metadata ends).

Figure 1D:
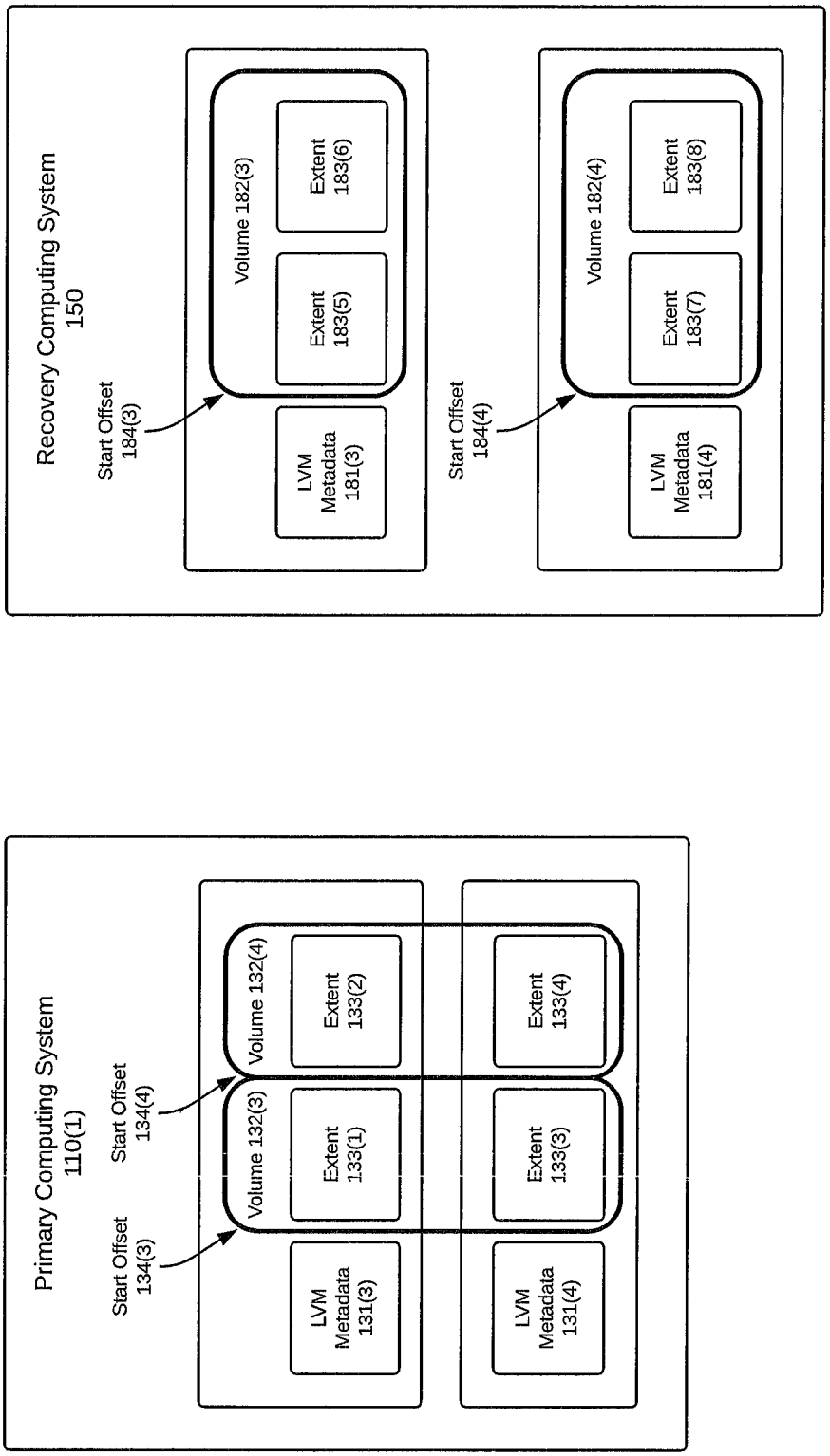
FIG. 1D a block diagram showing further details related to the storage of data in the primary computing system and recovery computing system depicted in FIG. 1A, according to one embodiment.

FIG. 1D depicts additional details related to the storage of data in the primary computing system and recovery computing system depicted in FIG. 1A, according to one embodiment. More specifically, FIG. 1D depicts striped storage volumes on a primary computing system (e.g., primary computing system 110(1)) and corresponding block storage volumes on a recovery computing system (e.g., recovery computing system 150). The striped storage volumes on primary computing system 110(1) enable a single volume to be spread across multiple disks. Thus, volume 132(3) includes physical extent 133(1) and physical extent 133(3), both of which are on different physical disks, but collectively encompass a single logical volume 132(3). Similarly, volume 132(4) includes physical extent 133(2) and 133(4), which are also on different physical disks but collectively comprise a single logical volume 132(4). Each disk with an extent contains logical volume manager (LVM) metadata 131 that can describe the content and location of the underlying data. Although only two volumes are shown in this depiction, with each volume only containing two physical extents, in application one or more volumes may be present, and each of those volumes may have one or more physical extents of varying sizes. Also depicted are the starting offsets 134(3) and 134(4) for each of the depicted volumes.

As was the case with FIG. 1C, recovery computing system 150 also contains two volumes as shown in FIG. 1D. As can be seen in FIG. 1D, however, those volumes are not striped. Thus, volume 182(3) stores data corresponding to volume 132(3) on the primary computing system, and volume 182(4) stores data corresponding to volume 132(4) on the primary computing system. Although not required in practice, each of the volumes 182(3) and 182(4) depicted here each contain the same number of physical extents 183 as the corresponding volume on primary computing system 110(1), which, in this case, is two physical extents 183 for each volume. In other embodiments, one or more volumes 182 on a recovery computing system (such as, e.g., recovery computing system 150) may have a different number of physical extents 183 than other volumes 182 on that (or on a different) recovery computing system. Moreover, the number of physical extents per volume 182 on a recovery computing system (such as, e.g., recovery computing system 150) may be different from the number of physical extents on a corresponding volume 132 on a primary computing system (such as, e.g., primary computing system 110(1)). Similarly to the primary computing system, each volume on the recovery computing system contains LVM metadata 181, which contains information about the associated volume. Moreover, as noted elsewhere, the logical volume manager(s) on the recovery computing system 150 may be different than the logical volume managers implemented on one or more of primary computing systems 120. Also, each volume on the recovery computing system has a start offset 184, which corresponds to the logical block location (or location of another unit of storage) where the associated volume begins (e.g., the logical block location immediately after the location where the LVM metadata ends).

FIG. 2 illustrates actions that can be performed to configure replication of data, according to one embodiment. In one embodiment, the steps of method 200 can be performed by an application node, such as any of recovery application nodes 160. Method 200 begins at 210 by provisioning and booting a recovery application node, such as recovery application node 160(1). A recovery application node, such as recovery application node 160(1), can host one or more application(s) and/or a virtual machine, among other appropriate functionality. Method 200 also provisions and attaches a block storage device at 220, such as cloud storage 180. In one embodiment, a recovery application node (e.g., recovery application node 160(1)) can be used to provision and attach the block storage device (e.g., cloud storage device 180). Once the block storage device has been provisioned and booted, method 200 can be used to create a contiguous logical volume on the block storage device at 230. In one embodiment, a recovery application node (e.g., recovery application node 160(1)) can be used to create the contiguous logical volume on the block storage device (e.g., cloud storage 180). As note elsewhere herein, the storage units and systems that are used to implement the storage devices described herein as block storage devices, such storage devices are referred to as such merely for ease and consistency of description. As will be appreciated in view of the present disclosure, numerous other storage systems and devices, alone or in combination, can be used to equally good effect in methods and systems such as those described herein.

Once a contiguous volume has been created, method 200 can write a volume signature to the metadata at the start of the volume at 240. In one embodiment, the signature is a unique identifier. As one example, the signature can be in the form of <solution_name_volume_start>. In other embodiments, the signature can be any other unique identifier and/or a unique label, e.g., "VOL1," "VOL2," or "CUSTOMER_X_VOLUME_1," among many other potential examples. After one or more of 210, 220 and 230 have been performed or otherwise satisfied, method 200 can be used to detach the block storage device (e.g., cloud storage 180) from the node that was used to perform one or more of 210, 220 and 230. In one embodiment, the recovery application node (e.g., recovery application node 160(1)) can be used to perform steps 210, 220 and/or 230, in which case the block storage device can be detached from that recovery application node in 240. Following step 240, the recovery application node (e.g., recovery application node 160(1)) can be shut down in 260 until the recovery application node is needed in the future (e.g., in the event of a failure on the primary site), at which point in time the recovery application node may be brought back online (as described elsewhere in this disclosure). Deprovisioning the recovery application node when that node is not otherwise in use enables the recovery computing system (and customers and other users thereof) to save valuable resources, including power, bandwidth, processing power, and usage fees.

Figure 3:
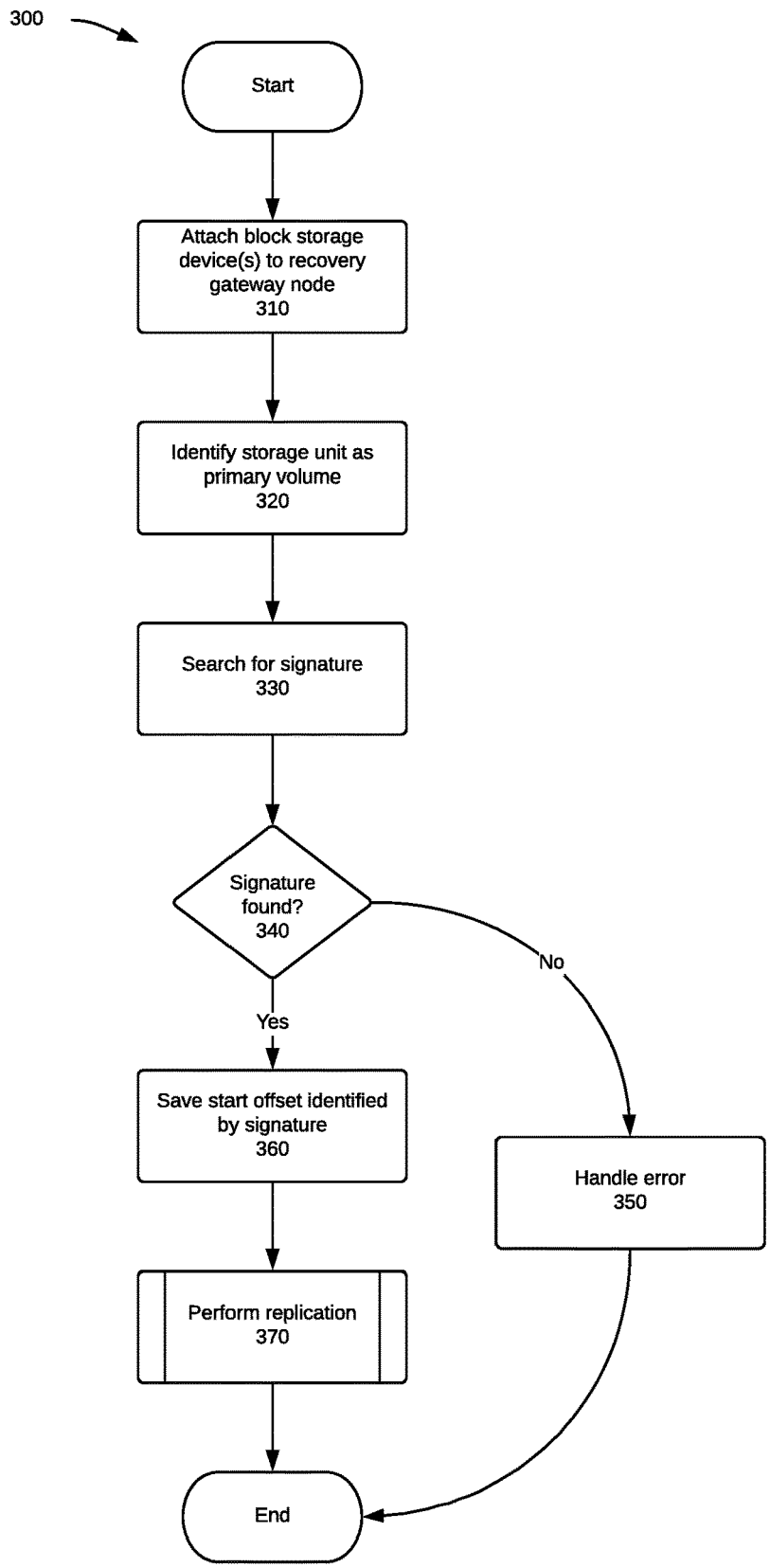
FIG. 3 is a flowchart that illustrates additional actions that can be performed to initiate replication of data, according to one embodiment.

FIG. 3 illustrates additional actions that can be performed to initiate replication of data, according to one embodiment. In one embodiment, the steps of method 300 can be performed by a gateway node, such as recovery gateway node 170. In one embodiment, the steps of method 300 are performed after one or more steps of method 200 have been performed.

Method 300 begins by attaching (e.g., communicatively coupling) a block storage device (e.g., cloud storage 180) to a recovery gateway node (e.g., recovery gateway node 170) in 310. Once a block storage device has been communicatively coupled to the recovery gateway node, the recovery gateway node can determine which disk in the block storage device was configured to store data coming from the specific primary computing system that is to be replicated. Although this method is generally discussed herein with respect to one such replication relationship at a time, multiple instances of method 300 (and other methods described herein, specifically including method 400 as relevant here) may be performed simultaneously and/or substantially at the same time as each other. Thus, referring back to the many-to-one configuration described in FIG. 1A, multiple primary computer systems may be communicatively coupled to a single recovery computer system, and thus, to a single recovery block storage device. Moreover, the block storage device may contain multiple physical disks (or other units of physical storage), each of which can correspond to a different primary volume. As such, a recovery gateway node must identify in 320 which storage unit (e.g., physical disk) of the block storage device (e.g., cloud storage 180) corresponds to a given primary computing system and related primary storage volume. Once the physical disk(s) corresponding to the volume are identified, a recovery gateway node can also search for the signature related to a given volume in 330. If a signature is not found in 340, then a recovery gateway node can handle the error (e.g., "throwing" an exception or providing an error alert) in 350, after which method 300 can end. If a signature is found in 340, the recovery gateway node persistently saves (e.g., into a memory) the start offset of the data region identified by the signature in 360. As will be discussed in more detail in conjunction with method 400 (and elsewhere in this disclosure), this information can be used by a recovery gateway node when performing replication in 370.

Figure 4:
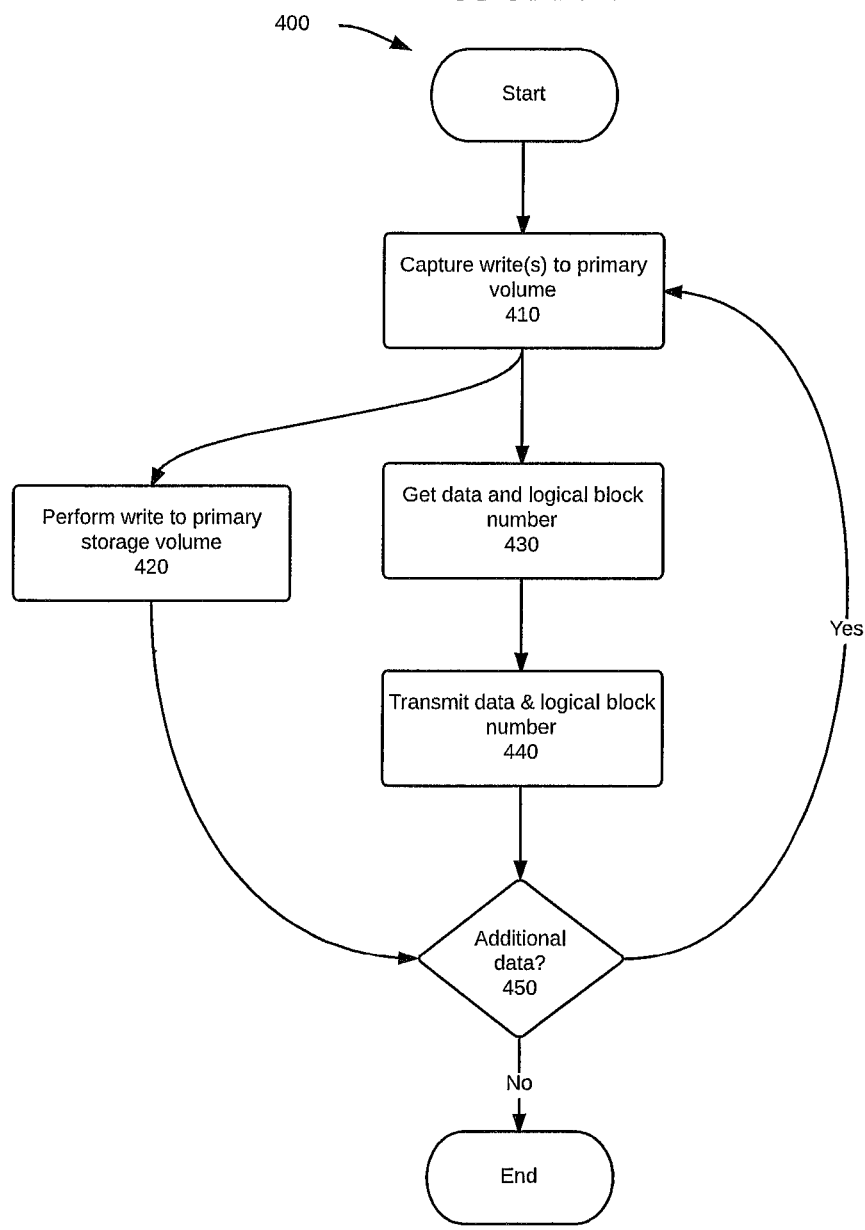
FIG. 4 is a flowchart that illustrates actions that can be performed in conjunction with the replication of data, according to one embodiment.

FIG. 4 illustrates actions that can be performed in conjunction with the replication of data, according to one embodiment. In one embodiment, method 400 can be performed by a primary computing system, such as primary computing system 110(1). As can be seen in conjunction with FIG. 1B, method 400 begins at 410 by capturing data that is being written to primary storage 130. In one embodiment, the data can be captured either before, or in the process of, being written to the primary storage volume in 420. In accordance with methods and systems such as those disclosed herein, the data is generally captured 410 at the logical volume level rather than at the physical disk level. As such, the metadata associated with the captured data can (and typically, does) include a logical block number corresponding to the logical storage location of that data. This logical block number corresponds to both the location the data is stored in primary storage 130, as well as the location that the captured data is to be stored in the block storage device (e.g., cloud storage 180) on the recovery computing system. As will be appreciated in light of the present disclosure, such information (e.g., logical block number) can, alternatively, be generated. In such a scenario, such generation can, but need not, use information gleaned from metadata (e.g., either that associated with the captured write data, and/or other metadata that includes information pertinent to the generation of the information to be sent to the recovery computing system in question.

The logical block number is the only portion of the metadata that is needed to correlate a block of data stored in primary storage 130 with the corresponding block of replicated data stored in the block storage device (e.g., cloud storage 180) on the recovery computing system. Thus, method 400 can be used to determine the relevant data and associated logical block number at 430. Although in one embodiment no metadata is captured at 410, in other embodiments any metadata that was captured in 410 (other than the logical block number) can be removed (e.g., deleted) or ignored when preparing the write in 430. Alternatively, such information can be generated by a capture module according to methods and systems such as those disclosed herein, in which case none of the metadata need be processed.

Method 400 can then continue with the replication by transmitting the captured data and the logical block number to the recovery computing system in 440. In one embodiment, the primary gateway node can transmit only the captured data and the logical block number in 440. In other embodiments, additional information may be transmitted in addition to the captured data and the logical block number. As is discussed elsewhere in this disclosure, however, no metadata (other than the logical block number) is required for methods and systems such as those disclosed herein to properly function. This fact, together with the fact that redundant copies of mirrored data are not transferred to cloud environment, provides a significant saving of bandwidth and other resources, since only the actual data and the logical block number are required to be transmitted over network 190. As shown in 450, method 400 may continuously loop whenever additional data is being written to the primary computing system and such data needs to be replicated to the recovery computing system. Moreover, although the looping may truly be continuous in one embodiment, in other embodiments the looping may simply be repeated whenever additional data is written on the primary computing system.

Figure 5:
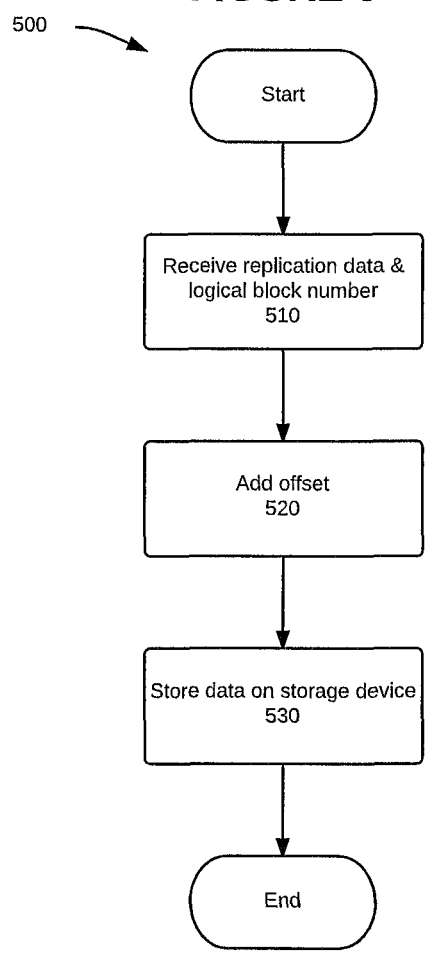
FIG. 5 is flowchart that illustrates additional actions that can be performed in conjunction with the replication of data, according to one embodiment.

FIG. 5 illustrates additional actions that can be performed in conjunction with the replication of data, according to one embodiment. In one embodiment, method 500 can be performed by a recovery computing system, such as recovery computing system 150. Method 500 begins at 510, where a recovery gateway node receives data to be replicated and the logical block number associated with that data. As can be appreciated from the discussions of other Figures herein, the received data can be the data was captured and transmitted in method 400. Similarly, the logical block number that is received in 510 can be the same logical block number that was captured and transmitted in method 400. In other embodiments, however, this data and logical block number may be received by the recovery gateway node in a manner other than the manner described in conjunction with method 400.

At 520, the necessary offset is added to the incoming replication data. The recovery computing system does not have to recreate any metadata (e.g., the metadata that was removed/ignored in 430), because the necessary metadata for use on the recovery computing system was created when a volume was created on the block storage device, such as, e.g., as part of the configuration process. Thus, when the volume was created in method 200, the necessary metadata was created and stored as well. Among other potential information, this metadata provides the offset that corresponds to the beginning of the volume (on the block storage device, such as, e.g., cloud storage 180) to be used to store the data being replicated. The offset is necessary because the metadata on the block storage device is stored at the beginning of the volume, so the offset can be used to determine where the metadata ends and the data portion of the volume begins. The recovery gateway node can then "add" the logical block number (received in 510) to the offset (determined in 520) in order to determine the logical block (of the block storage device) to which the incoming data should be written. Accordingly, the metadata that was created on the storage device during method 200 does not have to be (and generally is not) overwritten during this replication process. Rather than having to change or overwrite any metadata on the storage device, performance of 530 only requires the appropriate unit of storage (e.g., on the cloud storage device) to be written or overwritten, where the appropriate block is the block corresponding to the logical block number for the incoming data. Once the recovery gateway node has determined logical block number to which the incoming data should be written, the recovery gateway node can then store (e.g., write) that data at the determined logical block location on the block storage device (e.g., cloud storage 180) in 530 without having to change or overwrite any other data (or metadata). In one embodiment, storing the data 530 in the appropriate block (or other unit of storage) may include overwriting data that has been previously stored in that block (or other unit of storage). This scenario would arise, for example, where the content of a block (or other unit of storage) that had been previously written (to both the primary and recovery computing systems) was changed on the primary computing system, and that change was being replicated to the recovery computing system in 530.

Figure 6:
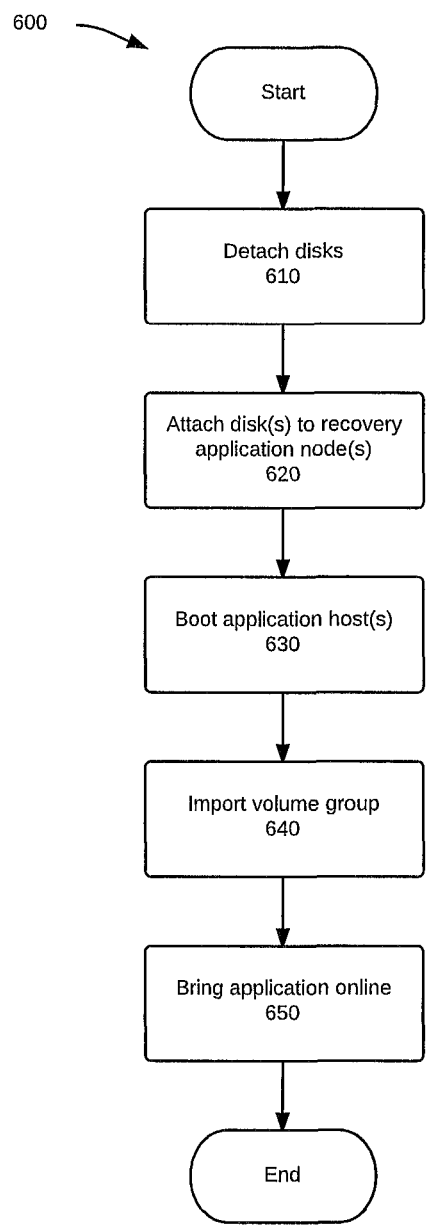
FIG. 6 is flowchart that illustrates actions that can be performed during a recovery procedure, according to one embodiment.

FIG. 6 illustrates actions that can be performed during a recovery procedure, according to one embodiment. In one embodiment, method 600 can be performed by a recovery computing system, such as recovery computing system 150. Although not expressly depicted in FIG. 6, method 600 may be performed in response to detecting a crash or other type of failure on a primary computing system, such as primary computing system 110(1). In other embodiments, method 600 can be performed for various other reasons other than in response to a crash or failure of a primary computing system.

Method 600 begins by detaching one or more disk(s) of the block storage device from the recovery gateway node at 610. In one embodiment, the disk(s) that are detached are those disk(s) that are specification to one or more application(s) that are hosted (or to be hosted) on a recovery application node (e.g., recovery application node 160(1)). At 620, the disk(s) that were detached in 610 can be attached to a recovery application node (e.g., recovery application node 160(1)). In one embodiment, one or more associated recovery application nodes 160 can be booted in 630 after the appropriate disk(s) have been attached. In other embodiments, one or more recovery application nodes 160 can be booted in 630 either before, simultaneously, or substantially simultaneously with the performance of 610 and/or 620.

Once the appropriate recovery application node(s) 160 have been booted and the appropriate disk(s) of the block storage device (e.g., cloud storage 180) have been attached to the recovery application node(s), the appropriate logical volume is imported to the recovery application node(s) 160 in 640. For instance, multiple volumes can required by one or more recovery application node(s) 160. Thus, as was depicted, e.g., in FIG. 1C, volumes 182(1) and 182(2) can be part of one volume group to which the recovered application writes. Thus, whether consisting of one volume or multiple volumes, the appropriate volume group needs to be imported (e.g., made available) to the appropriate recovery application node(s) 160 before input/output operations can start. In one embodiment, step 640 can be performed by importing the volume group containing the appropriate logical volume(s) to the recovery application node(s) 160. Importing the volume adds a volume group to the recovery application node(s) 160, and makes the volume accessible to recovery application node(s) 160. The on-disk metadata can be used to facilitate this process by providing necessary information to the recovery application node(s) 160, such as, e.g., information regarding the location of each underlying data block within the volume. Finally, the recovery application node(s) can be brought online (e.g., in place of the failed primary computing system), at which point method 600 is complete.

Although the storage units and systems that are used to implement the storage devices are generally described throughout this disclosure as block storage devices (and/or "cloud storage"), such storage devices are referred to as such merely for ease and consistency of description. As will be appreciated in view of the present disclosure, however, numerous other storage systems and devices, alone or in combination, can be used to equally good effect in methods and systems such as those described herein.

An Example Computing Environment

As shown above, the systems described herein can be implemented using a variety of computer systems and networks. Examples of such computing and network environments are described below with reference to FIGS. 7 and 8.

Figure 7:
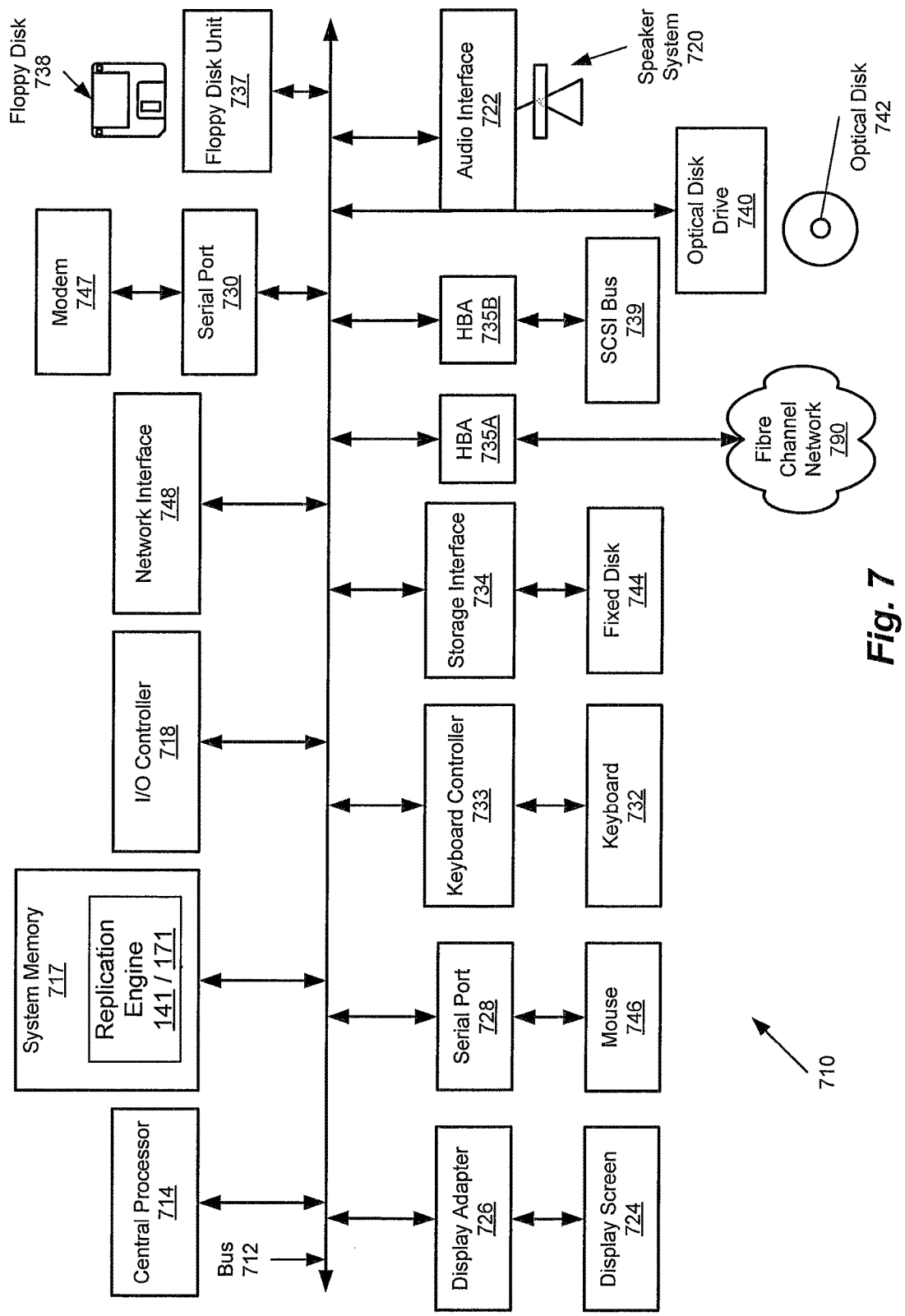
FIG. 7 is a block diagram of a computing device, illustrating how certain features of methods and systems such as those disclosed herein contained herein can be implemented in software, according to one embodiment.

FIG. 7 depicts a block diagram of a computer system 710 suitable for implementing aspects of the systems described herein. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Replication engine 141 and/or replication engine 171 may be embedded, encoded, or otherwise stored in or on system memory 717. Applications resident with computer system 710 are generally stored on and accessed from a computer-readable storage medium, such as a hard disk drive (e.g., fixed disk 744), an optical drive (e.g., optical drive 740), a floppy disk unit 737, or other computer-readable storage medium.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the systems described herein. The devices and subsystems can be interconnected in different ways from that shown in FIG. 5. The operation of a computer system such as that shown in FIG. 5 is readily known in the art and is not discussed in detail in this application. Code to implement the modules of the systems described herein can be stored in computer-readable storage media such as one or more of system memory 717, fixed disk 744, optical disk 742, or floppy disk 738. The operating system provided on computer system 710 may be MS-DOS®, MS-WINDOWS®, UNIX®, Linux®, AIX®, or another operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified)

between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there is inevitably some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

An Example Networking Environment

Figure 8:
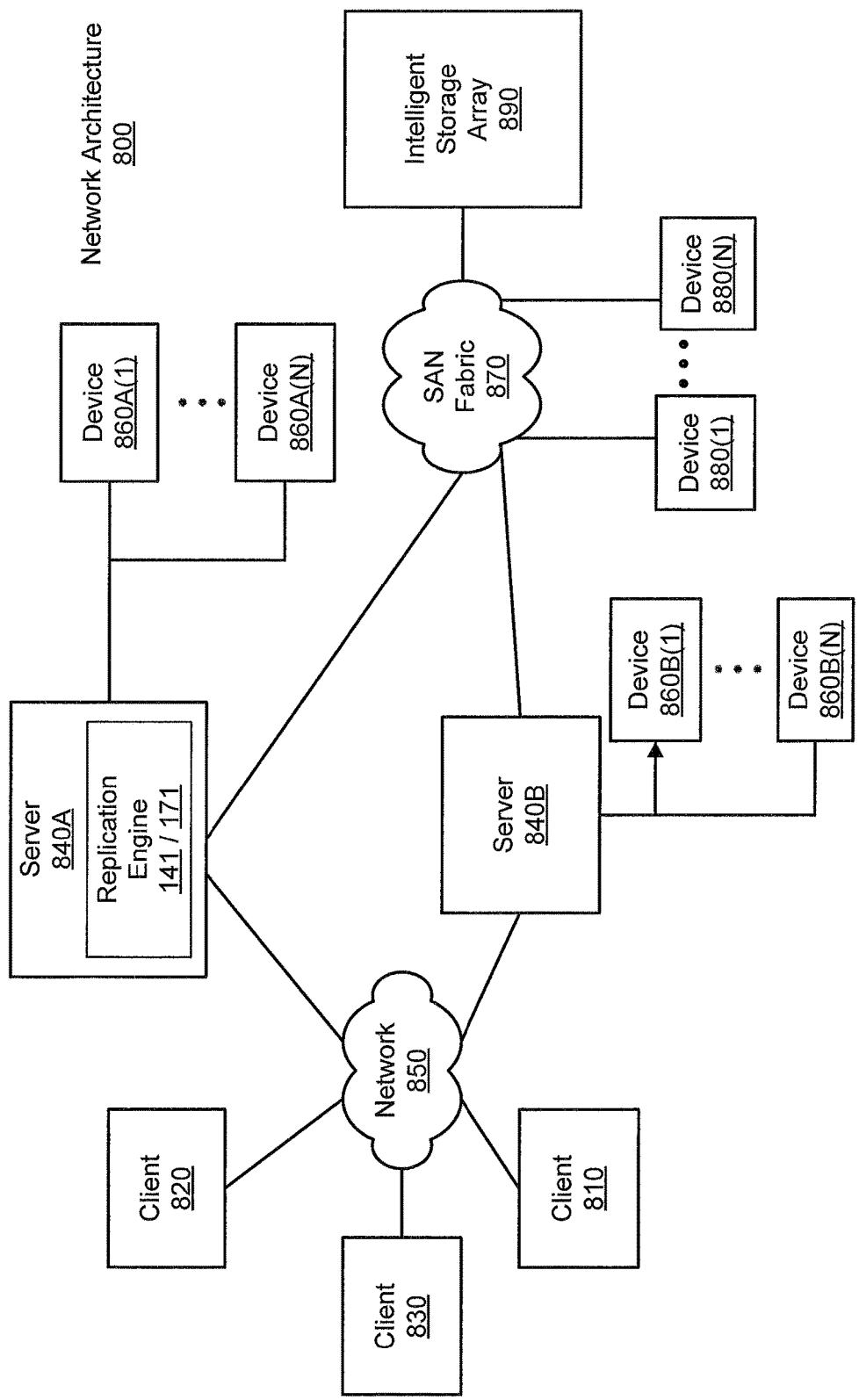
FIG. 8 is a block diagram of a networked system, illustration how various computing devices can communicate via a network, according to one embodiment.

FIG. 8 is a block diagram depicting a network architecture 800 in which client systems 810, 820 and 830, as well as storage servers 840A and 840B (any of which can be implemented using computer systems 810, 820, and/or 830), are coupled to a network 850, which can be the same network as network 190. Storage server 840A is further depicted as having storage devices 860A(1)-(N) directly attached, and storage server 840B is depicted with storage devices 860B(1)-(N) directly attached. Additionally, storage server 840A is depicted as containing replication engine 141 and/or replication engine 171. While not expressly depicted in FIG. 6, it is understood that replication engine 141 and/or replication engine 171 may be included on any storage server, such as storage server 840B, and may also be split among one or more servers, such as storage servers 840A and 840B. Storage servers 840A and 840B are also connected to a SAN fabric 870, although connection to a storage area network is not required for operation. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method, apparatus or device can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the systems described herein are not limited to the Internet or any particular network-based environment.

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a non-transitory machine-readable or non-transitory computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media, including any such type of non-transitory computer-readable storage media, may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present disclosure has been described in connection with several embodiments, the methods and systems such as those disclosed herein are not intended to be limited to the specific forms set forth herein. On the contrary, the methods and systems such as those disclosed herein are intended to cover such alternatives, modifications, and equivalents as can be reasonably included within the scope of the disclosure as defined by the appended claims.

What is claimed is:

1. A method comprising:
provisioning a recovery application node, wherein
the recovery application node is communicatively coupled to a computing system, and
the computing system comprises a recovery gateway node;
creating a contiguous storage volume on a storage device, wherein
the contiguous storage volume is created by the recovery application node,
the storage device is communicatively coupled to the recovery gateway node, and
the creating comprises writing information regarding a starting location associated with the contiguous storage volume;
receiving, from a remote computing system, first information at the recovery gateway node, wherein
the first information comprises
first data, and
a first storage location, and
the first storage location corresponds to a first location of the first data in a first logical storage unit of the remote computing system;
disconnecting the recovery application node from the contiguous storage volume; and
subsequent to the disconnecting of the recovery application node from the contiguous storage volume, using the recovery gateway node to store the first data in the contiguous storage volume on the storage device, wherein
the recovery gateway node is used to store the first data at a first location in the contiguous storage volume on the storage device, and
the first location is determined based on the starting location and the first storage location.

2. The method of claim 1, wherein
the disconnecting comprises shutting down the recovery application node, and
the shutting down is performed prior to storing the first data at the first location.

3. The method of claim 1, further comprising:
prior to creating the contiguous storage volume, provisioning the storage device, wherein
the recovery application node is used to provision the storage device,
the storage device is communicatively coupled to the computing system.

4. The method of claim 1, wherein
the remote computing system comprises a remote gateway node, and
the recovery gateway node is communicatively coupled to the remote gateway node.

5. The method of claim 4, wherein
the recovery gateway node comprises a first operating system,
the remote gateway node comprises a second operating system, and
the first operating system is distinct from the second operating system.

6. The method of claim 1, wherein storing the first data at the first location further comprises:
searching for a signature on the storage device, wherein
the signature is associated with a first replication volume,
the first replication volume comprises the first storage location,
the signature comprises an offset, and
the searching is performed prior to the receiving.

7. The method of claim 1, wherein
the storage device is a block storage device,
the first location comprises a first logical block number, and
the first location is determined based on the first logical block number and a first offset.

8. The method of claim 7, further comprising:
receiving second information at the recovery gateway node, wherein
the second information comprises
second data, and
a logical block number corresponding to the first location; and
storing the second data in the block storage device, wherein
the storing the second data comprises overwriting the first data.

9. The method of claim 1, wherein
the recovery application node is used to configure the contiguous storage volume as a striped storage volume.

10. The method of claim 1, wherein
the recovery application node is used to configure the contiguous storage volume as a mirrored storage volume.

11. The method of claim 1, further comprising:
subsequent to using the recovery gateway node to store the first data in the contiguous storage volume, detecting a failure of the remote computing system; and
subsequent to detecting the failure of the remote computing system, attaching the recovery application node to the contiguous storage volume; and
subsequent to attaching the recovery application node to the contiguous storage volume, bringing the recovery application node online to function in place of the remote computing system that failed.

12. A computer system comprising:
one or more processors; and
a memory coupled to at least one of the one or more processors and configured to store instructions executable by the one or more processors, the instructions configured to perform a method comprising:
provisioning a recovery application node, wherein
the recovery application node is communicatively coupled to a computing system, and
the computing system comprises a recovery gateway node;
creating a contiguous storage volume on a storage device, wherein
the contiguous storage volume is created by the recovery application node,
the storage device is communicatively coupled to the recovery gateway node, and creating the contiguous storage volume comprises writing information regarding a starting location associated with the contiguous storage volume;

receiving, from a remote computing system, first information at the recovery gateway node, wherein
the first information comprises
first data, and
a first storage location, and
the first storage location corresponds to a first location of the first data in a first logical storage unit of the remote computing system;

disconnecting the recovery application node from the contiguous storage volume; and subsequent to disconnecting the recovery application node from the contiguous storage volume, using the recovery gateway node to store the first data in the contiguous storage volume on the storage device, wherein
the recovery gateway node is used to store the first data at a first location in the contiguous storage volume on the storage device, and
the computing system is configured to determine the first location based on the starting location and the first storage location.

13. The system of claim 12, wherein:
disconnecting the recovery application node comprises shutting down the recovery application node, wherein
the recovery application node is shut down prior to storing the first data in the storage device of the computing system.

14. The system of claim 12, wherein the instructions are further configured to:
provision the storage device prior to creating the contiguous storage volume, wherein
the recovery application node is configured to provision the storage device,
the storage device is communicatively coupled to the computing system.

15. The system of claim 12, wherein
the remote computing system comprises a remote gateway node,
the recovery gateway node is communicatively coupled to the remote gateway node.

16. The system of claim 15, wherein
the storage device is a block storage device,
the first location comprises a first logical block number, and
the instructions are further configured to determine the first location based on the first logical block number and a first offset.

17. The system of claim 16, wherein the instructions are further configured to:
receive second information at the recovery gateway node, wherein
the second information comprises
second data, and
a logical block number corresponding to the first location; and
store the second data in the block storage device, wherein
storing the second data comprises overwriting the first data.

18. A non-transitory computer-readable storage medium configured to store program instructions that, when executed on a processor, are configured to cause the processor to perform a method comprising:
provisioning a recovery application node, wherein
the recovery application node is communicatively coupled to a computing system, and
the computing system comprises a recovery gateway node;

creating a contiguous storage volume on a storage device, wherein
the contiguous storage volume is created by the recovery application node,
the storage device is communicatively coupled to the recovery gateway node, and
the creating comprises writing information regarding a starting location associated with the contiguous storage volume;

receiving, from a remote computing system, first information at the recovery gateway node, wherein
the first information comprises
first data, and
a first storage location, and
the first storage location corresponds to a first location of the first data in a first logical storage unit of the remote computing system;

disconnecting the recovery application node from the contiguous storage volume; and subsequent to the disconnecting of the recovery application node from the contiguous storage volume, using the recovery gateway node to store the first data in the contiguous storage volume on the storage device, wherein
the recovery gateway node is used to store the first data at a first location in the contiguous storage volume on the storage device, and
the first location is determined based on the starting location and the first storage location.

19. The non-transitory computer-readable storage medium of claim 18, wherein the disconnecting comprises shutting down the recovery application node, and the shutting down is performed prior to storing the first data at the first location.

20. The non-transitory computer-readable storage medium of claim 19, wherein:
the storage device is a block storage device,
the first location comprises a first logical block number, and
the method further comprises
determining the first location based on the first logical block number and a first offset;
receiving second information at the recovery gateway node, wherein
the second information comprises
second data, and
a logical block number corresponding to the first location; and
storing the second data in the block storage device, wherein
the storing the second data comprises overwriting the first data.

* * * * *